W. W. GRAHAM.
Rock-Boring Machine.
No. 221,298. Patented Nov. 4, 1879.
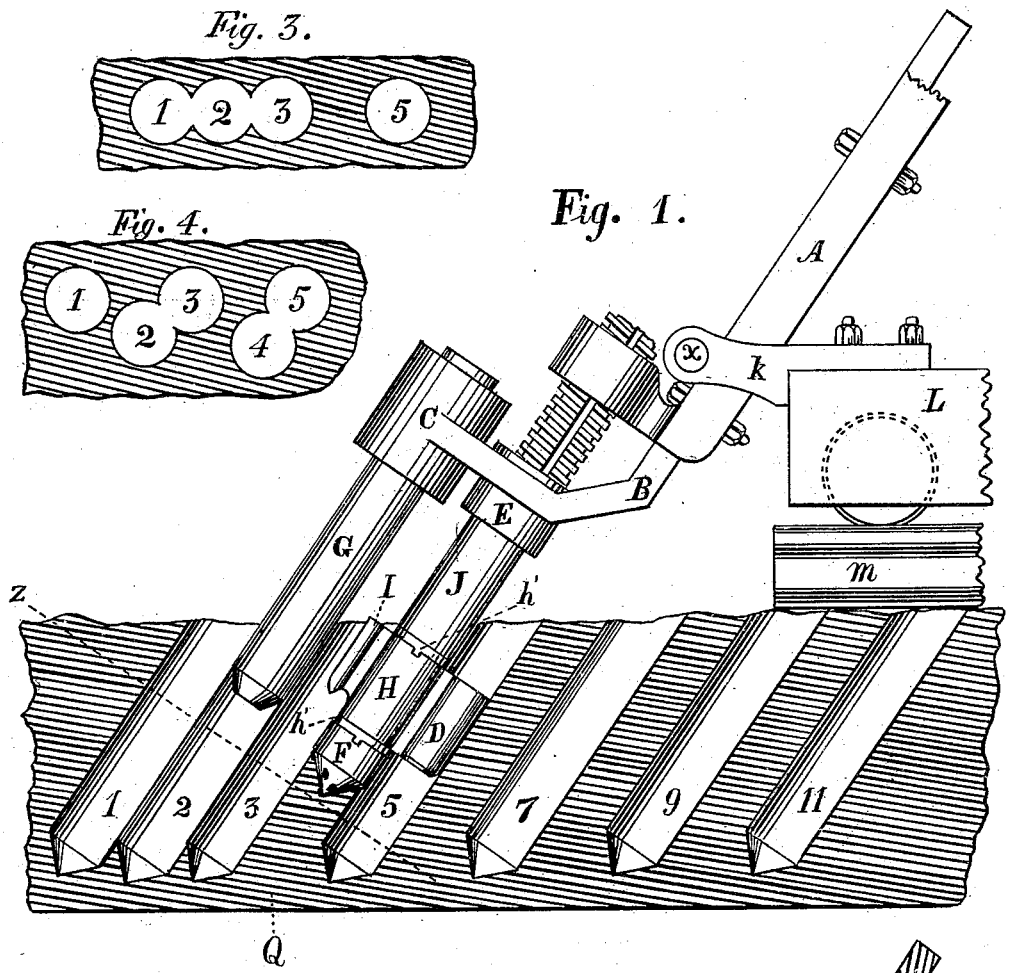
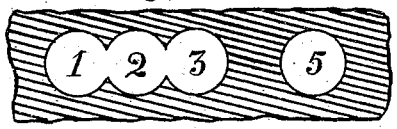
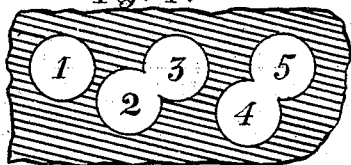
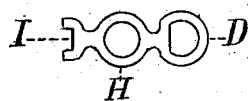
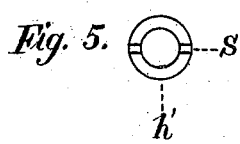
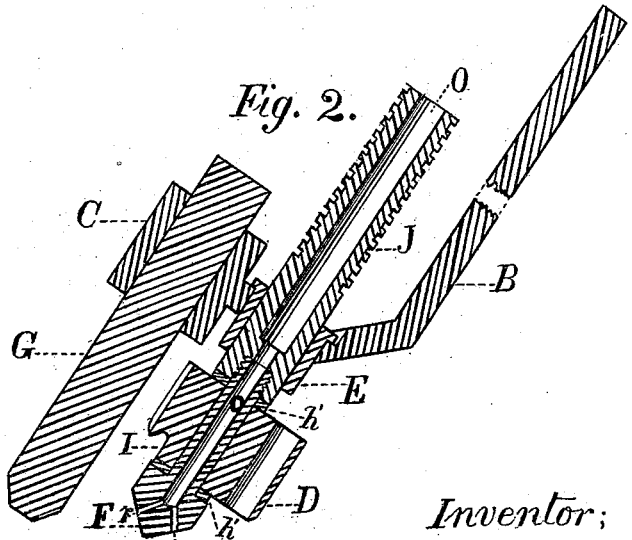
Witnesses:
C. H. Safford
B. McDermott
Inventor:
William Wesley Graham

UNITED STATES PATENT OFFICE.

WILLIAM W. GRAHAM, OF WEST RUTLAND, VERMONT.

IMPROVEMENT IN ROCK-BORING MACHINES.

Specification forming part of Letters Patent No. 221,298, dated November 4, 1879; application filed May 21, 1879.

*To all whom it may concern:*

Be it known that I, WILLIAM WESLEY GRAHAM, of West Rutland, in the town and county of Rutland and State of Vermont, have invented a new and useful Improvement in Rock-Boring Machines, of which the following is a specification.

The invention relates to adjustable brackets, gages, and guides for what are known as "diamond rock-boring machines."

Heretofore, when it was desirable to bore a series of holes parallel to and in line with each other, so as to make a continuous open space or channel in the rock, it has been done by two operations. By the first operation alternate holes, as first, third, fifth, and so on, of the series are bored, using a short plain sleeve on the boring-spindle just above the boring head or hub. The rock partition between these alternate holes of the series is removed by the second operation, in which the plain sleeve on the boring-spindle is dispensed with, and a sleeve with a guide attached to one side by a thin neck or web is used. The guide is allowed to pass down one of the holes bored by the first operation. This sleeve, with its single guide, is objectionable, as it does not prevent the hole which is bored from deviating either to the right or left of the line of holes, which is often the case, thereby leaving a portion of the rock partition, which has to be removed by other means.

When a series of holes are bored obliquely to the surface of the rock it is difficult to bore the alternate holes of the series the proper distance apart, as this distance, when measured on the surface of the rock, varies with the angle at which the machine is working.

If the distances are too great, all of the rock partition between the holes will not be removed by the second operation, and if the distances are too short there will not be sufficient rock between the holes to allow the drill to work freely. It would have a tendency to crowd or run into one of the holes previously bored, thereby choking and cramping the drill-spindle, making it difficult, and sometimes impossible, to bore the hole to the required depth.

The object of my invention is to provide means for boring the alternate holes of a series the proper distance apart, at whatever angle they may enter the rock surface; also, to provide means for preventing the boring hub and spindle from running to the right or left of the line, thereby insuring an open communication between the holes bored by the first and second operations.

In the accompanying drawings, in which similar letters of reference indicate like parts, I have represented such parts only of a diamond rock-boring machine as I deemed necessary to illustrate my improvement, in connection with the parts to which they are attached, and to show the operation of the same.

Figure 1 of the drawings is a side elevation of a portion of a diamond rock-boring machine embodying my invention, and a vertical section of rock to be operated upon. Fig. 2 is a vertical longitudinal section of the same parts of the machine. Fig. 3 is a cross-section of the rock cutting the series of holes at right angles at a point shown by the line Z in Fig. 1. Fig. 4 is a cross-section of rock cutting a series of holes near the bottom of said series at right angles when said holes are bored without the use of my double-guided sleeve. Fig. 5 is a view of the under side of a lugged washer, one being used at each end of the double-guided sleeve. Fig. 6 is an upper end view of the double-guided sleeve.

To enable the machine to bore holes at different angles, the rafter A, which supports the boring mechanism, is pivoted to the main frame L at $x$.

The boring-head F and its spindle J are the same as those now in use.

The devices for communicating the rotary and feed motions to the boring-spindle are not shown in the drawings, as any of the well-known devices can be used for that purpose.

B is an adjustable bracket secured to the lower end of the rafter A. The lower part of said bracket turns outward at right angles with a hub, C, at its extremity, in which is secured a round gage-pin, G, the lower end of which is chamfered.

E is a flanged sleeve or bearing supported by said bracket, through which the boring-spindle passes.

The gage-pin G holds a position parallel to the boring-spindle, and distant therefrom somewhat less than the diameter of the boring-head. The diameter of the gage-pin is the same as the holes bored by the machine.

H is a sleeve through which a hollow neck or tube, o, passes, that connects the boring-head with its spindle. Said sleeve is constructed with two guides, D and I, projecting from opposite sides. The guide D is of a hollow cylindrical form, and is united to the sleeve by a thin longitudinal web. The guide I is also united to the sleeve by a similar web. This guide is not hollow and cylindrical, but consists of angular lips projecting from the web to the right and left, as shown in Fig. 6.

The sleeve H, with the two projecting guides D and I, constitutes what I term a "double-guided sleeve."

The operation of the device is as follows: When the machine is placed in position for boring a series of holes the gage-pin G is secured sufficiently high in hub C that its lower end will not come in contact with rock Q. A plain sleeve without guides is used on the lower end of the boring-spindle J for boring the alternate holes of the series. After the power has been applied and the first hole has been bored to the required depth the boring-head F and spindle are withdrawn, and the machine moved so as to insert the gage-pin into said hole, where it is secured in position by means of a set-screw in the hub. (Set-screw not shown in drawings.) This operation secures the machine in position, and at the proper distance from hole No. 1 for boring hole No. 3. After hole No. 3 is bored, the boring-head, spindle, and gage-pin are again withdrawn, machine moved, and the gage-pin inserted in hole No. 3. The machine is then in position for boring hole No. 5. This operation is repeated for each of the remaining alternate holes of the series.

To bore out the intermediate spaces the plain sleeve is removed from the lower end of the boring-spindle, and the sleeve H, with its double guides D and I, used instead. The machine is then placed so that the boring-head will hold a central position over the space separating the holes 1 and 3. This position brings the two guides D and I into line with the holes 1 and 3. The machine is started, and as the boring-head advances into the rock the guides I and D enter the holes 1 and 3, respectively, passing down the same, thereby confining the action of the boring-head to the rock partition between said holes, and, as the diameter of the boring-head is greater than the thickness of the rock partition, an open communication is made between the holes 1, 2, and 3.

After the boring-head, with its guides and spindle, has been withdrawn, the machine is moved so as to permit the two guides to pass down the holes 3 and 5, when the machine will be in position for boring out the partition between holes 3 and 5.

In boring out the second partition and the subsequent ones the gage-pin G can be used in connection with the double-guide sleeve if desirable, as represented in Fig. 1. These operations are repeated until all of the partitions are bored out, thus forming an open communication between all of the holes of the series.

The relative position at the bottom of a series of holes bored when using the double-guide sleeve is shown in Fig. 3.

The relative position at the bottom of a series of holes bored when a sleeve with single guide is used is shown by Fig. 4.

As illustrative of a form of rock-drill having a single guide, I would refer to the patent to Case, March 22, 1870, which construction I fully disclaim.

The distinctive features of my invention are as follows: The sleeve H, adapted to encompass the drilling-tool, and having diametrically-opposite guides, whereby said tool is held on both sides, and is prevented from swinging around upon one guide as a center. This double guide also fulfills another important function in detecting whether or not the holes are bored into communication, for if there is too great a departure from a parallel position there will be a spur or piece of rock left between the channels, and as the guide cannot then be forced down the operator will know where the difficulty lies, while with a single guide the tool would go down, and the operator would not be aware of the lack of intercommunication. Another distinct feature of my invention is in constructing the angular bracket B with a sleeve, E, through which the drilling-tool works, and an offsetting hub, C, beyond carrying gage-pin G. With this construction the boring-tool is held firmly and steadily in all positions, since it is braced on one side by connection with the main frame and on the other side is braced against the rock through pin G and hub C.

In constructing double guide I H D, the side I is made smaller than D and of a bifurcated angular shape, so that if the alternate holes—as 1 and 3, for instance—are not precisely parallel, the structure of I will allow sufficient looseness to avoid cramping or breaking the guide.

I do not confine myself to the particular form of this guide I, (to the web and angular projections,) as any other form capable of passing down its respective hole or space between the holes can be used.

What I claim is—

1. A guide for a rock-boring drill, consisting of a sleeve or collar adapted to receive said drill, and having diametrically-opposite offsetting guides, substantially as and for the purpose described.

2. The sleeve H, having circular guide D and smaller bifurcated guide I, adapted to be used with a drill-tool, substantially as described.

3. The combination, with the drilling-tool, of the angular bracket B, connected with the main frame upon one side of the tool, and having upon the other side a hub, C, and gage-pin G, adapted to enter the rock, substantially as and for the purpose described.

WILLIAM WESLEY GRAHAM.

Witnesses:
THOMAS ROSS,
B. McDERMOTT.